UNITED STATES PATENT OFFICE.

OTTO CARL STRECKER, OF MENTZ, GERMANY.

PROCESS OF PREPARING ALUMINIUM PRINTING-PLATES.

SPECIFICATION forming part of Letters Patent No. 516,238, dated March 13, 1894.

Application filed December 1, 1893. Serial No. 492,524. (No specimens.) Patented in England September 12, 1892, No. 16,312; in Germany September 18, 1892, No. 72,470, and in France October 18, 1892, No. 225,017.

*To all whom it may concern:*

Be it known that I, OTTO CARL STRECKER, a subject of the Grand Duke of Hesse, residing in the city of Mentz, Germany, have invented certain new and useful Improvements in Processes of Preparing Aluminium Printing-Plates, (for which I have obtained Letters Patent in Germany, No. 72,470, dated September 18, 1892; in France, No. 225,017, dated October 18, 1892, and in Great Britain, No. 16,312, dated September 12, 1892,) of which the following is a specification.

It has hitherto not been possible to successfully prepare aluminium plates for lithographic printing. Every previous attempt has been frustrated on account of using the same etcher or corrosive as is used for the stone. This etcher or corrosive has failed to obtain the object desired because it does not produce a layer on the bare plate which adheres to the same firmly enough to prevent the spreading of the color.

After many experiments the process, which forms the subject of the present invention, has been discovered and by it the object desired is perfectly attained.

The process consists in spreading over the plates, which have been ground by means of sand and powdered pumice stone, a solution of phosphoric or hydrofluoric acid until the said acid has dissolved enough of the metal and formed with the latter a salt, which in the form of a whitish precipitate remains adherent to the metal. This precipitate is insoluble in water but yet has the property of being able to absorb the latter and retain it for a considerable time, which is necessary in printing.

When applying the acid solution, which is preferably of twenty per cent. strength, over the plate, care must be exercised to prevent the formation of bubbles. As soon as the precipitate is sufficiently thick it is washed clean, in order to remove the superfluous acid. The acid which still remains adherent after this treatment is next rendered harmless (neutralized) by a solution of alum or of any substance which has a like effect on the acid. After the acid has been rendered neutral, the plate is allowed to dry and is then ready for receiving a drawing or reprint.

When the drawing or reprint is ready the plate is treated with the following acid mixture;

| | Grams. |
|---|---|
| Gallic acid | 25 |
| Phosphoric acid or an equivalent quantity of hydrofluoric acid | 8 |
| Gum arabic | 130 |
| Water | 837 |
| | 1,000 |

A thin layer of this mixture is applied lightly with a fine rag and care must be taken to avoid the formation of bubbles. A continual rubbing is necessary and must also be carried out with celerity. The etcher or corrosive is then at once wiped again and washed off with a little water and the plate dried, after which it is ready for printing.

Instead of at first producing the precipitate and then the drawing, the process can be reversed. In this case the drawing is made on the untouched plate and after the varnishing, rubbing, drying and powdering (with talc) of the same, it is treated with the above described acid mixture in the manner described. The plate is then once more rolled, powdered and treated with a stronger acid mixture, in order to strengthen the precipitate. This stronger mixture is composed of the same constituents as the weaker, but contains fifteen grams more of phosphoric acid or an equivalent quantity of hydrofluoric acid and correspondingly less water. When the precipitate is thick enough, the stronger mixture is at once wiped and washed off with a little water. When the plate has been dried it is ready for printing.

It is not necessary to adhere exactly to the proportions of the various constituents of the etcher or corrosive as given above; the percentages may be varied within certain limits.

Ortho meta or pyrophosphoric acid may be used as the phosphoric acid and dextrin may be substituted for the gum.

Having fully described my invention, what I desire to claim and secure by Letters Patent is—

A process for the preparation of aluminium plates for lithographic printing, consisting in the formation on the plate, before or after the production of the drawing or reprint, by means of rubbing the same with a solution containing phosphoric or hydrofluoric acid, of a precipitate of an aluminium salt, which is insoluble in water but which absorbs the latter and prevents the spreading of the fatty color, substantially as described.

In testimony whereof I have signed my name to this specification in the presence of two subscribing witnesses.

OTTO CARL STRECKER.

Witnesses:
   AD. BARTZACK,
   CARL ED. HAHN.